(12) United States Patent
Butler

(10) Patent No.: US 6,720,973 B2
(45) Date of Patent: Apr. 13, 2004

(54) METHOD AND APPARATUS FOR TRANSFORMING COLOR GAMUT FROM ONE COLOR SPACE TO ANOTHER

(75) Inventor: David P. Butler, Tigard, OR (US)

(73) Assignee: Xerox Corporation, Stamford, CT (US)

( * ) Notice: Subject to any disclaimer, the term of this patent is extended or adjusted under 35 U.S.C. 154(b) by 121 days.

(21) Appl. No.: 10/083,018

(22) Filed: Feb. 26, 2002

(65) Prior Publication Data
US 2003/0160801 A1 Aug. 28, 2003

(51) Int. Cl.[7] .................................................. G09G 5/02
(52) U.S. Cl. ...................... 345/604; 345/591; 345/601; 345/589
(58) Field of Search ................................ 345/604, 591, 345/601, 589

(56) References Cited
U.S. PATENT DOCUMENTS

| | | | |
|---|---|---|---|
| 5,233,684 A | 8/1993 | Ulichney | 395/131 |
| 5,541,742 A | 7/1996 | Imao et al. | 358/518 |
| 5,734,802 A | 3/1998 | Maltz et al. | 395/109 |
| 5,903,275 A | 5/1999 | Guay | 345/430 |
| 6,088,038 A | 7/2000 | Edge | 345/431 |
| 6,400,843 B1 * | 6/2002 | Shu et al. | 382/167 |

\* cited by examiner

*Primary Examiner*—Matthew C. Bella
*Assistant Examiner*—Tam Tran
(74) *Attorney, Agent, or Firm*—Jeannette Walde

(57) ABSTRACT

A method for transforming color gamut from a first color space to a second color space, includes dividing the first color space into a first plurality of regions in an objective space; dividing a subset of the second color space into a second plurality of regions in the objective space; mapping a first region of said first plurality into a first region of said second plurality substantially without change; mapping a second region of said first plurality comprising an upper gamut of the first color space into a complementary second region of said second plurality; and mapping a third region of said first plurality comprising a lower gamut of the first color space with a gamma correction into a complementary third region of said second plurality.

14 Claims, 2 Drawing Sheets

METHOD AND APPARATUS FOR TRANSFORMING COLOR GAMUT FROM ONE COLOR SPACE TO ANOTHER

FIELD OF THE INVENTION

This invention relates generally to systems and method of transforming color gamut from one color space to another and, more particularly, to a system and method which transforms color gamut continuously from the saturated outer shell to the desaturated inner area of the color space.

BACKGROUND OF THE INVENTION

RGB displays increase saturation by increasing light intensity, while printers increase saturation by adding more pigment, which absorbs light. This means that RGB display color becomes lighter as it saturates while a printer color becomes darker as it saturates. Thus the saturated edges of a display gamut (e.g., sRGB display) tend to extend outside and above a printer's gamut, while a printer's gamut tends to extend below and outside the display's gamut, resulting in the loss of some colors. Images in display space are rendered best with some sort of objective mapping, but objective mapping does not preserve saturation at the edges of the gamut white to full saturation (everything gets lighter and desaturated), resulting in the distortion of some other colors. Conversely, graphics edge colors are best preserved with a more direct mapping while merely preserving hue (i.e., the most saturated red on the display is mapped to the most saturated red of the same hue on the printer), but this oversaturates colors like skin tones.

It would be desirable to map a color display space into a printer space in such a way, as to map the colors in the center of the gamut (colors normally associated with photos, such as skin tones) to have an "objective" (or "exact") mapping. This is so color photos appear the same on both the color display and the printed page. It would also be desirable to preserve the saturation of the colors on the edge of the gamut, which are usually used for graphics. Many mapping solutions use one transformation table for images and another transformation table for graphics.

Having two tables can be both time and resource expensive. Also, some images may contain both image elements and graphical elements, making use of either table on its own unsatisfactory. U.S. Pat. No. 5,734,802 to Maltz et al., "Blended Look-up Table for Printing Images with Both Pictorial and Graphical Elements" proposes a morph of two separate tables. Trying to meld both of these aims into one color table can cause an abrupt discontinuity during the transition between the saturated outer shell of the color space and the desaturated inner area. It would be desirable to create a smooth and continuous mapping that transforms a display color space to a printer color space which would give saturated colors for graphics, realistic colors for photos, and smooth transitions between the two.

SUMMARY OF THE INVENTION

A method for transforming color gamut from a first color space to a second color space, includes dividing the first color space into a first plurality of regions in an objective space; dividing a subset of the second color space into a second plurality of regions in the objective space; mapping a first region of said first plurality into a first region of said second plurality substantially without change; mapping a second region of said first plurality comprising an upper gamut of the first color space into a complementary second region of said second plurality; and mapping a third region of said first plurality comprising a lower gamut of the first color space with a gamma correction into a complementary third region of said second plurality. The upper gamut may include white to full color and the lower gamut may include full color to black. The gamma correction is applied to an outer edge of the first color space for increasing lightness and saturation at the edge. The method may be used in an image forming device to generate mappings in real-time. Alternatively, the method may be used to generate a lookup table, which may be stored in memory. The objective space may be Lab space, Luv space, Lch space, Xyz space, etc. The color spaces may be divided and mapped such that the borders between the regions in the space provide that transitions in gamut are mathematically continuous. This provides a smooth and continuous mapping that can be used to transform a display color space to a printer color space, which would give saturated colors for graphics, realistic colors for photos, and smooth transitions between the two.

Apparatus for transforming a digital color image comprising a plurality of first data elements, from a first color space to a second color space, includes a memory storing a lookup table comprising a mapping of first data values in the first color space to second data values in the second color space, the lookup table being generated by: dividing the first color space into a first plurality of regions in an objective space; dividing a subset of the second color space into a second plurality of regions in the objective space; mapping a first region of said first plurality into a first region of said second plurality substantially without change; mapping a second region of said first plurality comprising an upper gamut of the first color space into a complementary second region of said second plurality; and mapping a third region of said first plurality comprising a lower gamut of the first color space with a gamma correction into a complementary third region of said second plurality; and a processor, responsive to the lookup table and for each first data element having a first data value, for locating a corresponding second data value.

The method may be used to transform images in RGB display space through an objective space (such as Lab space) into CMYK printer space. The method divides the RGB display space into at least three separate areas using vector math, and remaps those areas linearly into the same number of complementary areas in the printer's color space. The first area represents colors in the center of the gamut and can be called a "Safe" area, because this area is preserved without change. Colors in this region map substantially identically from RGB space to CMYK space, without distortion or loss of colors. The second area is the upper gamut of the RGB color space (including white to full color), which is mapped into a complementary area on the printer space (which may or may not include the full saturation at that hue leaf). The third area is the lower gamut (full to black), which is mapped with a gamma correction on the outer edge vector to increase lightness and saturation at the edge of the gamut.

The method and apparatus map a color display space into a printer space, for example, in such a way, as to map the colors in the center of the gamut (colors normally associated with photos, such as skin tones) to have an "objective" (or "exact") mapping. Color photos generally appear the same on both the color display and the printed page in this region when an objective mapping is used. The method and apparatus also preserve the saturation of the colors on the edge of the gamut, which are usually used for graphics. The method and apparatus also create a smooth and continuous mapping that transforms a display color space to a printer color space, giving saturated colors for graphics, realistic colors for photos, and smooth transitions between the two.

DETAILED DESCRIPTION OF THE EMBODIMENTS

Figure 1:
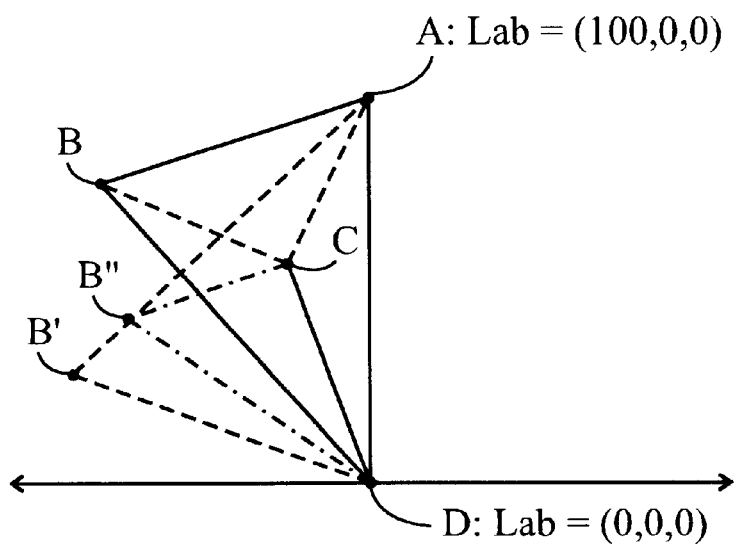
FIG. 1 shows two overlapping hue leaves in Lab space.

The method and apparatus of the invention may be used to transform color gamut from one color space to another color space. For example, the method and apparatus may be used to transform images in RGB color space to printer color space (CMYK color space. FIG. 1 portrays two overlapping hue leaves in Lab space. In Lab space, a line extending perpendicular to the L axis defines a range of colors having constant hue and varying saturation. Colors farther away from the L axis, but on a constant hue line, are more saturated. Within the Lab space, b is associated with a range between yellow and blue, while a is associated with a range between red and green. If a is positive, the color associated is reddish, while a negative a exhibits greenish color. When the b value is positive, the color exhibited is yellow, while a negative b value exhibits a bluish color. As positions within the Lab space swing toward the negative b axis, the colors turn more bluish. With respect to lines drawn perpendicularly from the L axis, each value along this line exhibits a constant hue.

The method may be used to transform images in sRGB display space into printer space. The method divides the RGB display space into at least three separate areas using vector math, and remaps those areas linearly into the same number of complementary areas in the printer's color space. Referring again to FIG. 1, the upper triangle (Triangle ABD in solid lines) represents an sRGB hue leaf and the lower triangle (Triangle AB'D in long dashed lines) represents a printer's hue leaf. Transforming color gamut from a first color space (e.g., sRGB) to a second color space (e.g., printer's space) can be accomplished by a continuous, one—one and onto mapping from ABD to a subset of AB'D, which removes part of the lower gamut from the color space. A subset of AB'D is desired because, if saturated colors close to B and on the line BD are mapped to B'D, then they will not only lose a great deal of lightness, since black will be added, they will also be dull. So a point B" will be created on the line AB' such that $$|AB'| \geq |AB''|.$$

This will lighten and desaturate the extremes of the resultant gamut. Further a gamma function will be used as a multiplier on vector DB" to lighten and saturate the resultant colors in the printer gamut.

The actual mappings are Vector Math mappings from triangle ACD to itself (identity mapping), ABC to AB"C and BCD to B"CD. The first area, ACD, represents colors in the center of the gamut and can be called a "Safe" area, because this area is preserved without change. The second area, ABC, is the upper gamut of the RGB color space (including white to full color), which is mapped into a complementary area on the printer space, AB"C (which may or may not include the full saturation at that hue leaf). The third area, BCD, is the lower gamut (full to black), which is mapped to B"CD. Further the vector DB" will be use a gamma function on its multiplier to lighten and saturate the resultant colors in the triangle B"CD. This produces a one—one, onto and continuous mapping, as was desired. Further, even if a hue leaf is not a perfect triangle and has points outside the triangle, that spatial relationship will be preserved with this method.

Sample mapping of hue leaf in first color space to hue leaf in second color space:

Step 1: Find the most saturated point in each hue leaf.

In vector math, any plane can be described with two vectors ($V_{p1}$ and $V_{p2}$) and a displacement vector from the origin ($V_{p0}$). So any two non-parallel vectors with a common origin describe a plane P such that for all points p in the plane P, there exist two scalar points a and b such that:

$$p = aV_{p1} + bV_{p2} + V_{p0} \qquad (1)$$

Figure 2:
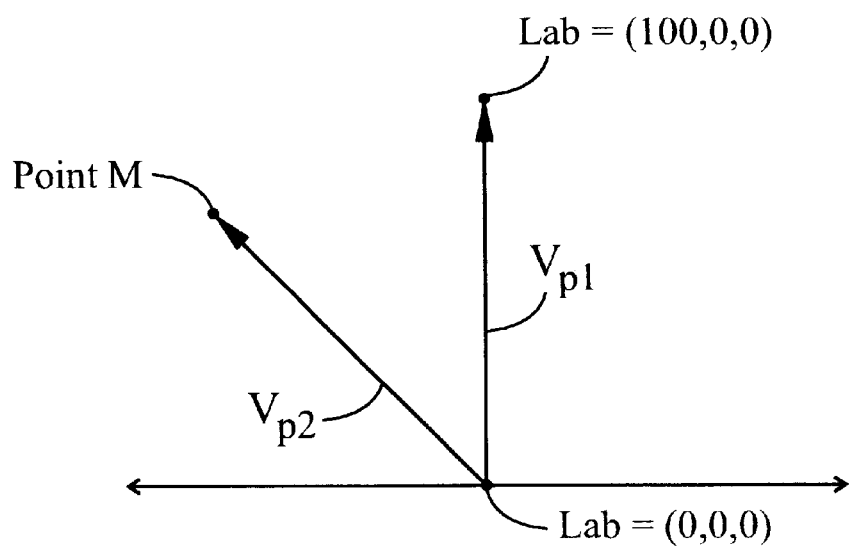
FIG. 2 is a graph of two vectors in Lab space.

Referring to FIG. 2, in the case of a hue leaf, $V_{p1}$ can be constrained to be the Lab space vector from point (0, 0, 0) to point (100, 0, 0), and $V_{p2}$ to be the vector from point (0,0,0) to the point in the source space to be mapped (Point M). (Note: we could also use the white point and black to which both the target space and printer spaces have been normalized.).

As for example, in the case of a tessellated space, consider each line segment in each gamut to determine the most saturated point in the hue leaf containing point M. Further, since we are only interested in the part of the plane which is part of the hue leaf, this constrains the scalars a and b to be greater than or equal to 0. To take into account the effect of round off error, define a positive epsilon such that the scalars a and b must be greater than or equal to -epsilon.

To find the most saturated point in hue leaf, first check to see if a line segment is parallel to the plane and can thus be trivially ignored. Compute the cross product of $V_{p1}$ and $V_{p2}$. This will result in a vector $V_{cp}$, which is perpendicular to the plane. Then compute the dot product of $V_{cp}$ and the line segment normalized to the origin. If the result is 0 (epsilon≦dot product≦epsilon), then the line segment is perpendicular to $V_{cp}$ and thus parallel to the plane, and should be ignored.

If the line segment is parallel to the plane then the intersection of the plane and the line containing the vector defining the line segment (denoted as $V_{L1}$), is computed. Point p ∈ line L iff∃ a scalar c such that $$p = cVL1 + VL0 \qquad (2)$$

$V_{L0}$ is the vector displacement from the origin to the beginning of $V_{L1}$. Combining Equations 1 and 2:

$$aVp1 + bVp2 + Vp0 = cVL1 + VL0 \qquad (3)$$

$$aVp1 + bVp2 - cVL1 = VL0 - Vp0 \qquad (4)$$

This simplifies to a series of three equations and three unknowns:

$$ax_{p1} + bx_{p2} - cx_{L1} = x_{L0} - x_{p0}$$

$$ay_{p1} + by_{p2} - cy_{L1} = y_{L0} - y_{p0}$$

$$az_{p1} + bz_{p2} - cz_{L1} = z_{L0} - z_{p0}$$

Solve for a, b and c with Cramer's rule. After comparing all line segments with the plane, select the intersection that matches the following criteria:

1) b>0
2) –epsilon $\leq c \leq$ 1+epsilon
3) intersection has greatest magnitude of saturation in Lab space of any line segment intersection which meets criteria 1 and 2.

This provides the most saturated point in hue leaf.

When the most saturated point for both gamuts on each hue leaf has been found, then compute point B" on the printer space.

Step 2: Find most saturated point in both color gamuts on hue leaf to find safe area.

Calculate the intersection of vector DB (L1) with vector AB" (L2). This means trying to solve the equation:

$aV_{L1}+V_{L01}=bV_{L2}+V_{L02}$ (note that these scalar values a and b are different values from the previous a and b).

This equation is equivalent to:

$$aV_{L1}-bV_{L2}=V_{L02}-V_{L01}$$

This creates a set of 3 equations:

$$ax_{L1}-bx_{L2}=x_{L02}-x_{L01}$$

$$ay_{L1}-by_{L2}=y_{L02}-y_{L01}$$

$$az_{L1}-bz_{L2}=z_{L02}-z_{L01}$$

Since there are only two unknowns, only two equations are needed. However, it should be noted that for a hue leaf, x/y is a constant, and only z is independent of the other two. Thus always use the z equation. Further do not use either x when x=0 or y when y is 0, so use the x equation when y=0 and the y equation when x=0. Since x and y will never equal 0 at the same time, it is easiest to always pick the equations of the larger one. So when x>y the derivation will be:

$$axL1-bxL2=xL02-xL01$$

$$azL1-bzL2=zL02-zL01$$

which using Gaussian elimination is modified to:

$$axL1zL1-bxL2zL1=xL02zL1-xL01zL1$$

$$azL1xL1-bzL2xL1=zL02xL1-zL01xL1$$

With subtraction, this becomes $$b*(zL2xL1-xL2zL1)=xL02zL1-xL01zL1-zL02xL1+zL01xL1$$

Solving for b becomes:

$$b=(xL02zL1-xL01zL1-zL02xL1+zL01xL1)/(zL2xL1-xL2zL1)$$

Using back substitution from the z equation, we get:

$$a=(zL02-zL01+bzL2)/zL1$$

If y >x the equation solving for b will be:

$$b=(yL02zL1-yL01zL1-zL02yL1+zL01yL1)/(zL2yL1-yL2zL1)$$

and the equation for a remains the same.

If a<=1+epsilon, and b<=1+epsilon, then the intersection point is $aV_{L1}+V_{01}$.

If a<=1+epsilon, and b>1+epsilon, then the intersection point is $V_{L2}+V_{02}$.

If a>1+epsilon, and b<=1+epsilon, then the intersection point is $V_{L1}+V_{01}$.

If a>1+epsilon, and b>1+epsilon, then recalculate the intersection of vectors DB" (L1) and AB (L2).

Safe area (center gamut) point C, in Lab space, is calculated as a percentage (0<val<1) in from the intersection point:

LstarC=z of intersection.
astarC=val * (x of intersection)
bstarC=val * (y of intersection)

Step 3: Determine which triangle should be used to compute the Vector relationship.

The appropriate triangle (in FIG. 1) for the vector transformation, needs to be determined. Is the point in the safe area (ADC), in or above the upper triangle (ABC), or is it in or below the lower triangle (BCD)?

The equation to see where a point is in a plane is as follows:

$$aVp1+bVp2+Vp0=pt.$$

This produces three equations:

$$axp1+bxp2=xpt-xp0$$

$$ayp1+byp2=ypt-yp0$$

$$azp1+bzp2=zpt-zp0$$

Again, as with the previous equations there are only two unknowns, so only two equations are need. Note again that for a hue leaf, x/y is a constant, and only z is independent of the other two. Thus, use the z equation. As before, do not use either x when x=0 or y when y is 0, so use the x equation when y=0 and the y equation when x=0. Since x and y will never equal 0 at the same time, it is easiest to always pick the equations of the larger one. So when x>y the derivation will be:

$$axp1+bxp2=xpt-xp0$$

$$azp1+bzp2=zpt-zp0$$

This reduces to:

$$b*(zp2xp1-xp2zp1)=aptzp1-xp0zp1-zptxp1+zp0xp1$$

which becomes:

$$b=(xptzp1-xp0zp1-zptxp1+zp0xp1)/(zp2xp1-xp2zp1)$$

For y>x, this becomes:

$$b=(yptzp1-yp0zp1+zp0yp1)/(zp2yp1-yp2zp1).$$

Then solve for a with the equation:

$$a=(bzp2+zpt-zp0)/zp1$$

First apply this method to the safe area (ACD) and determine a and b. Set $V_{p1} \equiv DA$, $V_{p2} \equiv DC$, and $V_{p0} \equiv$ the null vector. If a and b>–epsilon, a and b<1+epsilon, and (a+b) <1+epsilon, then the point is in the safe area of Lab space and can be left as is (Triangle ADC in Display Space maps to triangle ADC in Printer Space and point M'=point M).

If not in the safe area, then next apply the method to the upper triangle (ABC). Set $V_{p1} \equiv AC$, $V_{p2} \equiv AB$, and $V_{p0} \equiv DA$. If a & b>–epsilon, a & b<1+epsilon, and (a+b)<1+epsilon, then the point is in the upper triangle. If not, then if a <–epsilon and b>0, then point M is above the upper triangle and should still be mapped as part of the upper triangle (Triangle ABC in Display Space maps to triangle AB"C in Printer Space and point M'=$aV_{p1'}+bV_{p2'}+V_{p0'}$, where $V_{p1'} \equiv AC$, $V_{p2'} \equiv AB"$, and $V_{p0'} \equiv DA$).

If the point is not in or above the upper triangle, then apply the method to the lower triangle (BCD). Set $V_{p1} \equiv DC$, $V_{p2} \equiv DB$, and $V_{p0} \equiv$ the null vector. It is important to note that the colors on the lower triangle need to be lightened and increased in saturation to have a pleasing appearance for sky and forest scenes. So b is modified by a gamma function to increase b in a nonlinear way (a power function is sufficient as b ranges between 0 and 1). Then use a and b to compute point M' as part of the lower triangle (Triangle BCD in Display Space maps to triangle B"CD in Printer Space and point $M'=aV_{p1'}+bV_{p2'}+V_{p0'}$, where $V_{p1'} \equiv DC$, $V_{p2'} \equiv DB''$, and $V_{p0'} \equiv [0, 0, 0]$).

Figure 3:
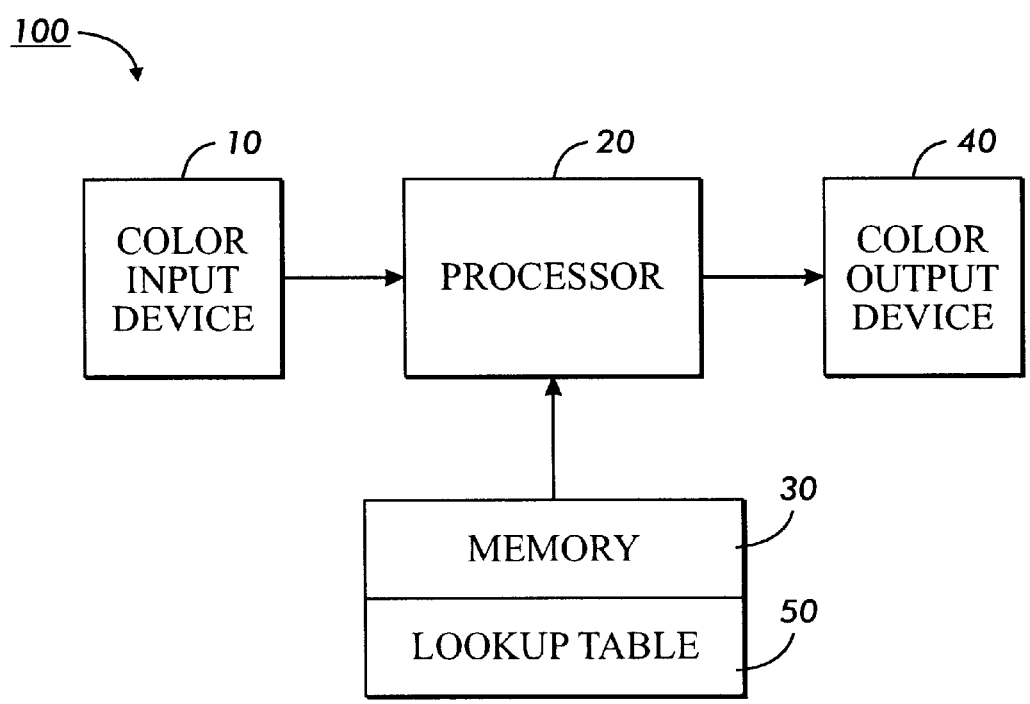
FIG. 3 is a block diagram of an apparatus for transforming a digital color image from a first color space to a second color space.

Referring to FIG. 3, an apparatus 100 for transforming a digital color image from a first color space to a second color space includes a color input device 10, which provides a digital color image comprising a plurality of data elements within a first color gamut, such as RGB. Data elements are provided to processor 20 which uses the lookup table 50 stored in memory 30 to find a correspondence to a data value in a second color space. Once this correspondence has been found, the data value in the second color space is provided to output color device 40. The lookup table 50 has been generated using the method described above.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method for transforming color gamut from a first color space to a second color space, comprising:
    dividing the first color space into a first plurality of regions in an objective space;
    dividing a subset of the second color space into a second plurality of regions in the objective space;
    mapping a first region of said first plurality comprising a center gamut of the first color space into a first region of said second plurality substantially without change;
    mapping a second region of said first plurality comprising an upper gamut of the first color space into a complementary second region of said second plurality; and
    mapping a third region of said first plurality comprising a lower gamut of the first color space with a gamma correction into a complementary third region of said second plurality.

2. The method of claim 1, wherein the upper gamut comprises white to full color and wherein the lower gamut comprises full color to black.

3. The method of claim 1, wherein the gamma correction is applied to an outer edge of the first color space for increasing lightness and saturation at the edge.

4. The method of claim 1, wherein the first region of the first plurality and the first region of the second plurality are identical.

5. The method of claim 1, further comprising storing the results of the mappings in a lookup table.

6. The method of claim 1, wherein borders between regions in the first color space are selected such that transitions in gamut between regions are mathematically continuous.

7. The method of claim 6, wherein borders between regions in the second color space are selected such that transitions in gamut between regions are mathematically continuous.

8. The method of claim 1, wherein the first color space comprises RGB space and the second color space comprises CMYK space.

9. The method of claim 1, wherein the objective space comprises Lab space.

10. Apparatus for transforming a digital color image comprising a plurality of first data elements, from a first color space to a second color space, comprising:
    a memory storing a lookup table comprising a mapping of first data values in the first color space to second data values in the second color space, the lookup table being generated by:
        dividing the first color space into a first plurality of regions in an objective space;
        dividing a subset of the second color space into a second plurality of regions in the objective space;
        mapping a first region of said first plurality comprising a center gamut of the first color space into a first region of said second plurality substantially without change;
        mapping a second region of said first plurality comprising an upper gamut of the first color space into a complementary second region of said second plurality; and
        mapping a third region of said first plurality comprising a lower gamut of the first color space with a gamma correction into a complementary third region of said second plurality; and
    a processor, responsive to the lookup table and for each first data element having a first data value, for locating a corresponding second data value.

11. In a system having a color image source device and a color image destination device having non-coincident color gamuts such that a plurality of colors within a color gamut of the source device are out of gamut colors outside a color gamut of the destination device, a method of transforming source device colors to destination device colors, comprising:
    storing in advance in fixed, non-volatile, machine-readable form a correspondence between gamut colors that are source device colors and respective destination device colors, said correspondence being derived by:
        dividing the source space into a first plurality of regions in an objective space;
        dividing a subset of the destination color space into a second plurality of regions in the objective space;
        mapping a first region of said first plurality comprising a center gamut of the first color space into a first region of said second plurality substantially without change;
        mapping a second region of said first plurality comprising an upper gamut of the first color space into a complementary second region of said second plurality; and
        mapping a third region of said first plurality comprising a lower gamut of the first color space with a gamma correction into a complementary third region of said second plurality; and
        transforming source device colors to respective destination device colors based on said correspondence.

12. The method of claim 1, wherein each mapping is a continuous and one to one.

13. The apparatus of claim 10, wherein each mapping is a continuous and one to one.

14. The method of claim 11, wherein each mapping is a continuous and one to one.

* * * * *